United States Patent
Tello et al.

(10) Patent No.: US 10,358,905 B2
(45) Date of Patent: Jul. 23, 2019

(54) ULTRASONIC LOGGING METHODS AND APPARATUS FOR MEASURING CEMENT AND CASING PROPERTIES USING ACOUSTIC ECHOES

(71) Applicant: Weatherford/Lamb, Inc., Houston, TX (US)

(72) Inventors: Lucio N. Tello, Houston, TX (US); Edwin K. Roberts, Benbrook, TX (US); Thomas J. Blankinship, Fort Worth, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 416 days.

(21) Appl. No.: 14/153,174

(22) Filed: Jan. 13, 2014

(65) Prior Publication Data

US 2015/0198030 A1   Jul. 16, 2015

(51) Int. Cl.
*E21B 47/00* (2012.01)
*G01V 1/50* (2006.01)

(52) U.S. Cl.
CPC .......... *E21B 47/00* (2013.01); *E21B 47/0005* (2013.01); *G01V 1/50* (2013.01)

(58) Field of Classification Search
CPC ........ G01V 1/50; E21B 47/00; E21B 47/0005
USPC ....... 367/86, 35, 25, 27, 81, 911, 31, 34, 28, 367/30, 32, 69, 73, 912, 14, 57, 82, 159, 367/38, 88, 1, 104, 13, 140, 151, 157, 367/174, 176, 189, 2, 26, 29, 3, 33, 4, 43, 367/44, 50, 53, 75, 87, 89, 908, 99; 181/105, 102, 108, 104, 106, 101, 112, 181/119, 122, 107, 118, 139, 401, 0.5; 73/152.16, 152.01, 152.46, 152.47, 73/152.58, 152.43, 152.08, 152.18, (Continued)

(56) References Cited

U.S. PATENT DOCUMENTS 3,308,426 A * 3/1967 Wilson ..................... G01V 1/50
                                                                 367/28
3,369,626 A * 2/1968 Zemanek, Jr. ...... E21B 47/0002
                                                             346/33 WL (Continued)

FOREIGN PATENT DOCUMENTS

WO   1999031354   6/1999
WO   2007047878   4/2007

OTHER PUBLICATIONS

Office Action for CA Patent Application No. 2,877,248; dated Dec. 21, 2015; pp. 1-4.
(Continued)

*Primary Examiner* — Isam A Alsomiri
*Assistant Examiner* — Amie M Ndure
(74) *Attorney, Agent, or Firm* — Blank Rome LLP

(57) ABSTRACT

A method and apparatus for measuring parameters of a borehole using an acoustic logging system. By transmitting a high frequency acoustic signal essentially perpendicular to the major axis of a borehole casing using a transducer, the high frequency acoustic signal may produce one or more acoustic echoes. By receiving and analyzing a first acoustic echo from an inner wall of the borehole casing and at least one second acoustic echo from a back wall of the borehole casing, borehole parameters such as the impedance of the casing cement and the thickness of thicker borehole casings, up to and greater than 1 inch, may be determined.

23 Claims, 5 Drawing Sheets

(58) Field of Classification Search
USPC .......... 73/152.19, 152.49, 152.54, 597, 623,
73/152.02, 152.05, 152.06, 152.11,
73/152.15, 152.17, 152.28, 152.32,
73/152.34, 152.36, 152.51, 152.52,
73/152.55, 152.62, 627, 784
See application file for complete search history.

(56) References Cited

U.S. PATENT DOCUMENTS

| | | | | |
|---|---|---|---|---|
| 3,474,879 | A * | 10/1969 | Adair | E21B 47/082 181/104 |
| 3,683,326 | A * | 8/1972 | White | G01V 1/46 367/25 |
| 3,883,841 | A * | 5/1975 | Norel | G01V 1/44 181/102 |
| 4,251,773 | A * | 2/1981 | Cailliau | G01V 3/20 324/347 |
| 4,661,933 | A * | 4/1987 | Seeman | E21B 47/082 181/102 |
| 4,685,092 | A * | 8/1987 | Dumont | G01V 1/44 181/104 |
| 4,701,891 | A * | 10/1987 | Castagna | G01V 1/46 367/29 |
| 4,827,457 | A * | 5/1989 | Seeman | E21B 47/082 181/102 |
| 5,146,050 | A * | 9/1992 | Strozeski | G01V 1/52 181/102 |
| 5,274,604 | A | 12/1993 | D'Angelo et al. | |
| 5,341,345 | A * | 8/1994 | Warner | E21B 47/082 181/105 |
| 5,644,550 | A | 7/1997 | Priest | |
| 6,018,496 | A * | 1/2000 | Stanke | E21B 47/0005 181/105 |
| 6,188,643 | B1 * | 2/2001 | Liang | E21B 47/00 367/26 |
| 7,394,257 | B2 * | 7/2008 | Martinez | E21B 47/00 324/356 |
| 8,201,625 | B2 * | 6/2012 | Almaguer | E21B 7/061 166/250.08 |
| 8,636,060 | B2 * | 1/2014 | Hernandez | E21B 21/08 166/250.01 |
| 2003/0005748 | A1 * | 1/2003 | Fiebelkorn | G01N 29/02 73/32 A |
| 2006/0067162 | A1 | 3/2006 | Blankinship et al. | |
| 2006/0071983 | A1 * | 4/2006 | Stearns | B41J 2/14008 347/68 |
| 2007/0019506 | A1 | 1/2007 | Mandal | |
| 2008/0189041 | A1 * | 8/2008 | Froelich | G01V 1/48 702/7 |
| 2009/0166031 | A1 * | 7/2009 | Hernandez | E21B 21/08 166/250.01 |
| 2009/0166035 | A1 * | 7/2009 | Almaguer | E21B 7/061 166/254.1 |
| 2010/0095757 | A1 * | 4/2010 | Hansen | G01N 29/043 73/152.16 |
| 2010/0118649 | A1 * | 5/2010 | Zhao | E21B 47/0005 367/35 |
| 2011/0087434 | A1 * | 4/2011 | Lie | E21B 47/0002 702/8 |
| 2013/0155812 | A1 * | 6/2013 | Froelich | E21B 47/0005 367/35 |

OTHER PUBLICATIONS

Foianini, I.; "Cement Evaluation Behind Thick-Walled Casing with Advanced Ultrasonic Pulse-Echo Technology: Pushing the Limit"; SPWLA 54th Annual Logging Symposium; New Orleans, LA; Jun. 22-26, 2013; pp. 1-9.
Patent Examination Report No. 1 for AU Patent Application No. 2015200125; dated Dec. 23, 2015; pp. 1-6.
European Search Report for EP Patent Application No. 15150840.5; dated Feb. 19, 2016; pp. 1-8.
Second Examination Report in counterpart Australian Appl. 2015200125, dated Apr. 13, 2016, 4-pgs.
Notice of Acceptance in counterpart Australian Appl. 2015200125, dated Aug. 25, 2016, 3-pgs.
Second Office Action in counterpart Canadian Appl. 2877248, dated Oct. 26, 2016, 4-pgs.

* cited by examiner

ULTRASONIC LOGGING METHODS AND APPARATUS FOR MEASURING CEMENT AND CASING PROPERTIES USING ACOUSTIC ECHOES

BACKGROUND OF THE DISCLOSURE

Well boreholes are typically drilled in earth formations to produce fluids from one or more of the penetrated formations. The fluids include water and hydrocarbons such as oil and gas. Well boreholes are also drilled in earth formations to dispose waste fluids in selected formations penetrated by the borehole. The boreholes may be lined with tubular commonly referred to as casing. Casing may be steel, although other metals and composites such as fiberglass can be used. The outer surface of the casing and the borehole wall form an annulus, which may be filled with a grouting material such as cement. The casing and cement sheath perform several functions. One function is to provide mechanical support for the borehole and thereby prevent the borehole from collapsing. Another function is to provide hydraulic isolation between formations penetrated by the borehole. The casing can also be used for other functions such as means for conveying borehole valves, packers, pumps, monitoring equipment and the like.

The wall of the casing can be thinned. Corrosion can occur both inside and outside of the casing. Mechanical wear from pump rods and the like can wear the casing from within. Any type of casing wear can affect the casing's ability to provide mechanical strength for the borehole.

Grouting material such as cement filling the casing-borehole annulus hydraulically isolates various formations penetrated by the borehole and casing. If the cement is not properly bonded to the outer surface of the casing, hydraulic isolation is compromised. If the cement does not completely fill the casing-cement annulus, hydraulic isolation is also compromised. Furthermore, if casing corrosion occurs on the outer surface or within, or if wear develops within the casing, holes can form in the casing and hydraulic isolation can once again be compromised.

In view of the brief discussion above, it is apparent that measures of casing wear, casing corrosion, cement bonding and cement distribution behind the casing can be important from economic, operation and safety aspects. These measures will be subsequently referred to as borehole "parameters of interest."

Measures of one or more of these borehole parameters of interest are useful over the life of the borehole, extending from the time that the borehole is drilled until the time of abandonment. It is therefore economically and operationally desirable to operate equipment for measuring the borehole parameters of interest using a variety of borehole survey or "logging" systems. Such logging systems can comprise multi-conductor logging cable, single conductor logging cable, and production tubing.

Currently ultrasonic methods are employed for measuring many of these parameters of interest. The current ultrasonic method for measuring the acoustic impedance of the material behind casing and the casing thickness involves the acoustic excitation of the casing using an ultrasonic transmitter and sensor to induce resonant reverberations in the pipe, and later receive a returned signal back at the ultrasonic sensor.

As shown in FIG. 3, a typical acoustic waveform measured by a scanning transducer (155) in the prior art is shown. According to the prior art, acoustic waveforms may be recorded from a transducer used to scan the inner circumference of a borehole casing and are preferably digitized in a data processor. The acoustic waveform of FIG. 3 is a plot of the transducer intensity (voltage) as a function of time. For purposes of discussing the prior art shown in FIG. 3, it will be assumed that the waveform is received by a transducer and represents the first returned signal reflection from the inside of the borehole casing. After the transducer is fired, the first reflection occurs at time $t_1$ having an amplitude 312. The time interval between $t_0$ and $t_1$ is defined as the travel time, and is a function of the impedance of the borehole fluid and the distance between the face of the transducer and the inner surface of the borehole casing.

As briefly discussed above, the prior art is directed to inducing a resonance in the borehole casing and subsequently analyzing the frequency characteristics of the resonant frequency reflection. For example, referring back to FIG. 3, the frequency of the reflected waveform in the intermediate frequency time interval 314 is a function of the casing thickness, while the amplitude and rate of decay or "ring down" of the reflected waveform in the ring down time interval 316 is a function of the bonding between the borehole casing and the casing cement, with its value being inversely proportional to the acoustic impedance of the casing cement.

Using the method of inducing reverberations in the casing, the magnitude of the returning resonant reverberations are inversely proportional to the acoustic impedance of the material behind the casing (i.e., cement). However, in very thick casings, for example casings thicker than 1-inch, the ultrasonic sensor has difficulty inducing the reverberations because the resonant frequency of the casing falls too low for typical ultrasonic tools. Examples of using ultrasonic waves for determining "parameters of interests" of a borehole are disclosed in U.S. Pat. App. 2006/0067162 which is incorporated herein in its entirety.

One current solution for determining one or more of the above parameters of interest is to lower the transducer center frequency to cover the frequency band of thick casings. However, when the frequency of the signal becomes too low, the return reverberations are in the noise level and as a result, the impedance value of the material behind the casing and thickness of the casing cannot be quantified.

Additionally, to manufacture transducers having center frequencies low enough to induce resonant reverberations in these thick pipes, the transducers would need to be so thick that the material comprising the transducers (e.g., ceramic) will be weakly polarized or not polarized at all. As a result, it is impractical to manufacture such a transducer. Because lowering the transducer center frequency to cover the frequency band of thicker casings is impractical, accurately measuring the above borehole parameters of interest without having to induce reverberations in the borehole casing is desirable.

The subject matter of the present disclosure is directed to overcoming, or at least reducing the effects of, one or more of the problems set forth above.

SUMMARY OF THE DISCLOSURE

A method and apparatus for using acoustic echoes generated by ultrasonic scanning transducers for measuring properties of a borehole. The method and apparatus uses acoustic echoes for measuring properties in a borehole system using ultrasonic transducers to emit acoustic energy waves into the borehole environment, not for inducing a resonance in the borehole casing as presently used in the art, but instead for generating acoustic echoes. The responses of the above described acoustic echoes may be analyzed to determine the thickness of tubular casings up to and more than 1-inch thick.

The foregoing summary is not intended to summarize each potential embodiment or every aspect of the present disclosure.

DETAILED DESCRIPTION OF THE DISCLOSURE

Overview of the System

Figure 1:
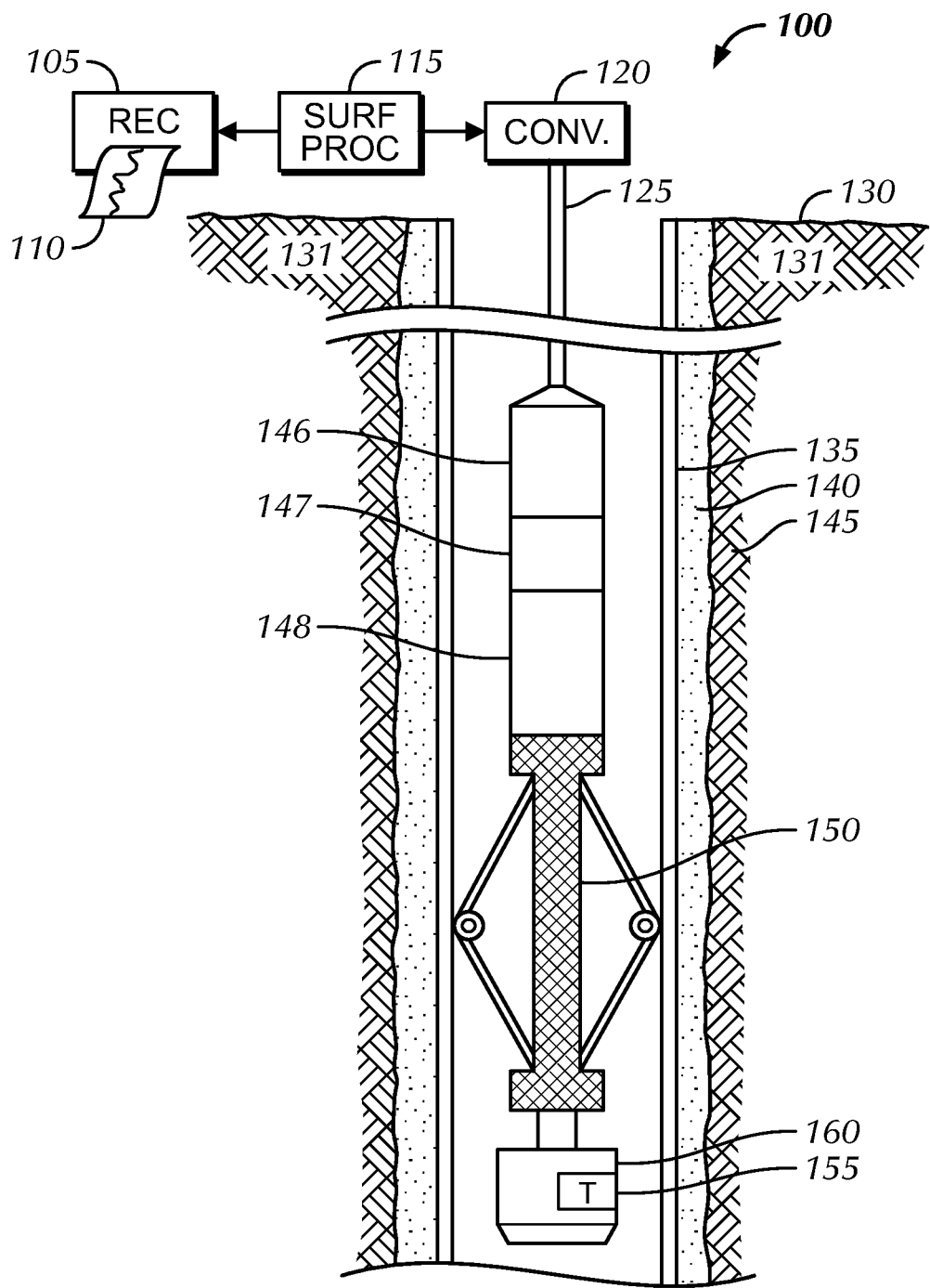
FIG. 1 illustrates a downhole tool disposed in a borehole according to the present disclosure.

FIG. 1 illustrates an Ultrasonic Cement Scanner logging system "downhole tool 100" disposed in a borehole according to the present disclosure. The downhole tool 100 is suspended into the borehole at the end of a data conduit 125. The borehole is defined by tubular casing 135 and casing grout 140, which provide several important functions such as providing mechanical support for the borehole, hydraulic insulation, and a conveyance means 120. The casing grout 140, being between the tubular casing 135 and the borehole wall 145, may be composed of cement. The annulus of the borehole is defined by the borehole wall 145, which is the outer surface of the casing grout 140, and serves to protect the borehole by hydraulically isolating the various formations penetrated by the borehole and casing in the surface of the earth 130. The borehole may be filled with fluid.

As shown in FIG. 1, the lower end of the tool is terminated by a scanning head 160, which comprises an ultrasonic scanning transducer 155. The scanning head 160 is rotated about the major axis of the tool and the scanning transducer 155 is activated or "fired" in sequential bursts while rotating.

The scanning transducer 155 is disposed such that emitted acoustic energy bursts are directed essentially perpendicular to the tubular casing 135. The scanning head 160 may be activated at numerous azimuthal positions inside the borehole preferably at sequential time intervals, about 72 times per revolution of the scanning head 160. After the scanning transducer 155 emits a burst of acoustic energy, the acoustic energy burst interacts with the tubular casing 135 and returns to the scanning transducer 155 for measurement. At this point, the returned emitted acoustic energy burst is measured by the scanning transducer 155 and subsequently processed. Although, only one scanning transducer 155 is indicated, there may be many more scanning transducers 155 within the scanning head 160 for emitting and receiving acoustic energy pulses.

As shown, the scanning head 160 is attached to a centralizer assembly 150, which serves to position the downhole tool 100 essentially in the center of the borehole. Also, as illustrated in FIG. 1 the centralizer assembly 150 is attached to a mechanical subassembly 148, which comprises a motor and functions to rotate the scanning head 160. Also, the mechanical subassembly 148 as shown is attached to an optional reference transducer assembly 147. The reference transducer assembly 147 is disposed above the mechanical subassembly 148 and functions to measure the slowness and the acoustic impedance of the borehole fluid, and for providing data for tool calibration during logging. The reference transducer assembly 147 can further serve to monitor borehole fluid acoustic properties such as its impedance and sound velocity. In addition it serves to monitor systematic variations within the tool such as any drift of the scanning transducer 155 or temperature related changes in the electronic components. These measurements can be used by the reference transducer assembly 147 to correct parameters of interest that are measured by the scanning transducer 155 due to environmental or operational conditions downhole.

Referring to FIG. 1, the reference transducer assembly 147 is connected to an electronics subassembly 146. The electronics subassembly 146 as shown comprises the electronics for controlling the various elements of the tool. These electronics comprise a control processor, which directs the operation of the downhole tool 100, a data processor which processes the acoustic signals from the scanning transducer 155 and the reference transducer assembly 147 to obtain the one or more parameters of interest, and a power supply for operating the electronics within the tool.

The downhole tool 100 is also disposed within the tubular casing 135 by the data conduit 125 that is operationally attached at the surface of the earth 130 to a conveyance means 120. The downhole tool 100 can have a variety of configurations depending on whether the data conduit 125 is a multi-conductor wireline, a single conductor cable, or coiled tubing having one or more conductors therein.

Another aspect of the upper end of the downhole tool 100 includes a surface processor 115. The surface processor 115 is used for processing data at the surface, and is operationally connected to the conveyance means 120. A recording means 105 also cooperates with the surface processor 115 for generating one or more data logs 110 "logs" of parameters of interest measured within the borehole. For purposes of this discussion, it will be assumed that the data conduit 125 is a wireline cable comprising one or more conductors, and the conveyance means 120 is a logging system draw works comprising a motor, winch, and tool depth measuring apparatus.

Figure 2:
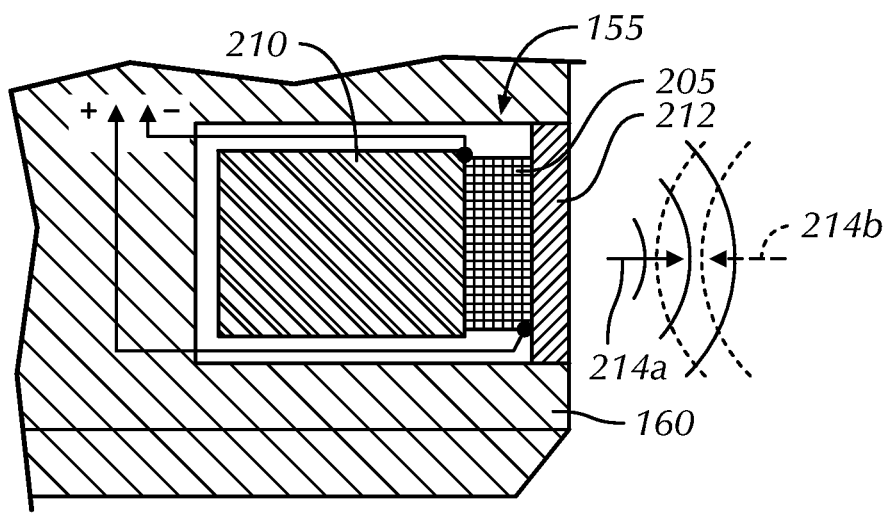
FIG. 2 illustrates a detailed view of a scanning transducer assembly disposed within a scanning head according to the present disclosure.
Figure 3:
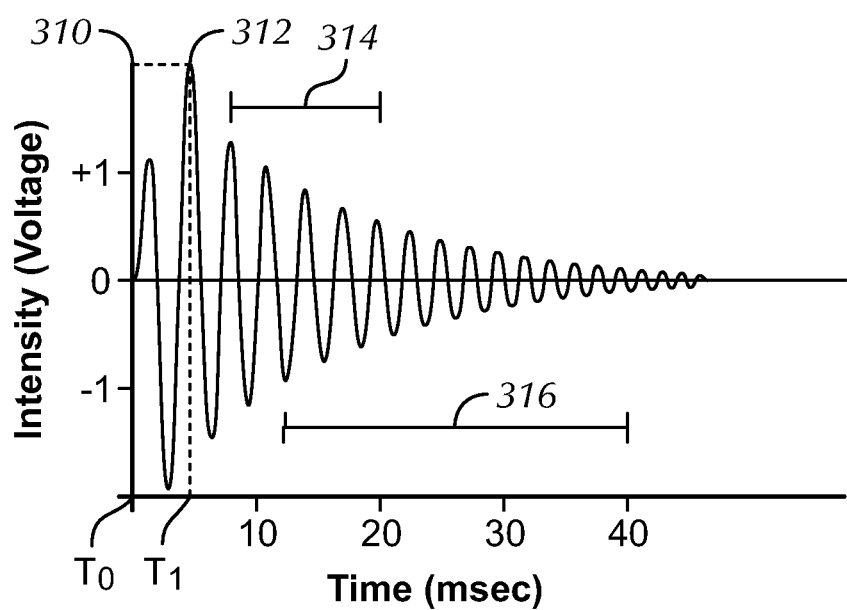
FIG. 3 illustrates a typical acoustic waveform measured by a scanning transducer according to the prior art.

Referring now to FIG. 2, a detailed view of a scanning transducer 155 is shown disposed within a scanning head 160 according to the present disclosure. Although only one transducer assembly is illustrated, it should be understood that two or more transducer assemblies may be disposed within the scanning head 160. The scanning transducer 155 assembly may comprise a piezoelectric crystal 205 operating in the 450 Kilohertz (kHz) range. One face of the crystal may be covered with a window 212. A second face of the crystal may be attached to a backing material 210. The backing material 210 is a composite comprising a large density material, which may have a density in the range of 10 grams per cubic centimeter (gm/cm$^3$) to 19 gm/cm$^3$. The composite mixture can be fabricated to match the acoustic impedance of the backing material 210 with the acoustic impedance of the crystal.

Matching these acoustic impedances allows the scanning transducer to direct bursts of acoustic energy into the tubular casing (135) as illustrated by the acoustic energy waves 214a and 214b. The crystal and backing material 210 can be encapsulated in a material such as epoxy, and the scanning transducer 155 is received in the scanning head 160. As the scanning head 160 rotates, bursts of acoustic energy waves are emitted circumferentially around the borehole. As illustrated in FIG. 2, after acoustic energy waves 214a are emitted, the waves interact with the tubular casing (135) and return to the scanning transducer 155 within the scanning head 160. As shown, the returning acoustic energy waves in FIG. 2 are represented by acoustic energy waves 214b.

Rotation or "stepping" of the scanning head 160, firing of the transducer, and reception of the return signal are controlled by elements in the electronics subassembly (146) and the mechanical subassembly (148). These functions are timed so that data obtained from the firing-reception cycle are independent of prior and subsequent firing-reception cycles thereby optimizing accuracy and precision of measured parameters of interest. The scanning transducer 155 is preferably fired 72 times per revolution of the scanning head 160, and the scanning head 160 is rotated preferably six times per second. If a sufficient number of transducers is provided, the rotational features of the scanning transducer may be omitted, allowing mechanical simplification of the device while still collecting data at varying azimuths.

Acoustic Echoes

Figure 4A:
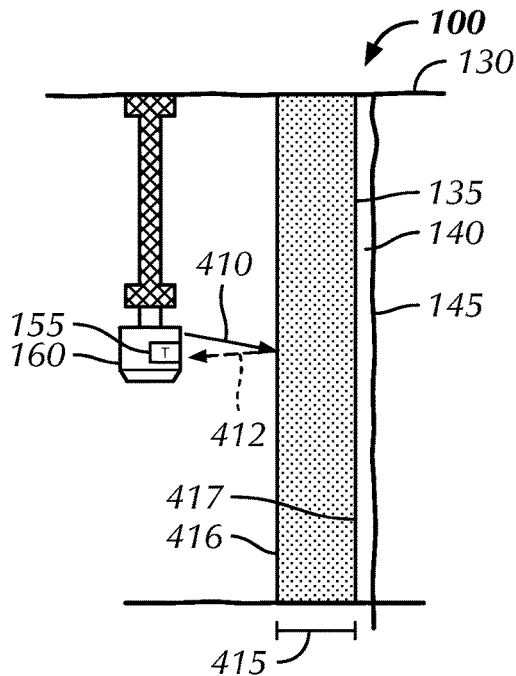
FIG. 4A illustrates a downhole tool including a scanning transducer disposed in a borehole and receiving a first echo according to the present disclosure.

FIG. 4A, illustrates a downhole tool 100 including a scanning transducer 155 disposed in a borehole according to the present disclosure. The scanning transducer 155 is shown emitting a high frequency acoustic energy wave 410 into the surrounding borehole, essentially perpendicular to the major axis of the borehole. As shown, the tubular casing 135 has both an inner wall 416 and a back wall 417 separated by a casing thickness 415. Also shown is a scanning transducer 155 located within the scanning head 160 of the downhole tool 100. The scanning head 160 will rotate, emitting and receiving acoustic energy waves in the surrounding borehole.

Paying particular attention now to the scanning transducer 155 and the emitted high frequency wave 410, the acoustic energy of the high frequency wave 410 will pass through the borehole fluid and subsequently contact the first inner wall 416 having certain amplitude. In this illustration the high frequency wave may have a frequency of at least 3 to 5 times the resonance of the casing for generating the acoustic echoes. The subsequent acoustic energy wave reflection (inner wall echo 412) from the inner wall 416 is received at the scanning transducer 155 for measurement. The amplitude of the inner wall echo 412 (first reflection amplitude 510) is a function of the corrosion of the inner wall 416 of the tubular casing 135 such as cracks or other perforations.

Figure 4B:
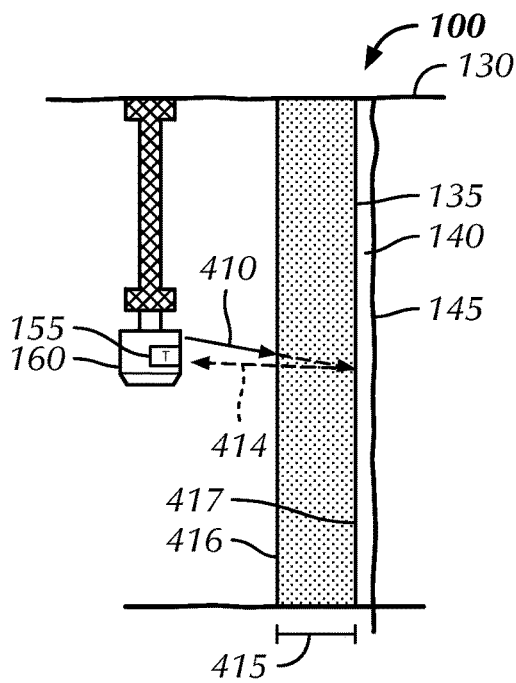
FIG. 4B illustrates a downhole tool including a scanning transducer disposed in a borehole and receiving a second echo according to the present disclosure.

Turning now to FIG. 4B, the downhole tool 100 including the scanning transducer 155 is disposed in a borehole receiving an echo from the back wall 417 of the tubular casing 135 (back wall echo 414). In this embodiment, the scanning transducer 155 emits a high frequency wave 410 producing an acoustic echo from the back wall 417 of the tubular casing 135. While most of the high frequency wave 410 reflects from the inner wall 416 of the tubular casing 135, some of the high frequency wave 410 will penetrate through the tubular casing 135 (penetrating wave 411) and reflect from the back wall 417 having a corresponding second reflection amplitude 530. Both of these reflections or echoes will be received at the scanning transducer 155 and can be measured to determine both the thickness of the tubular casing 135 and the impedance of the casing grout 140.

Figure 4C:
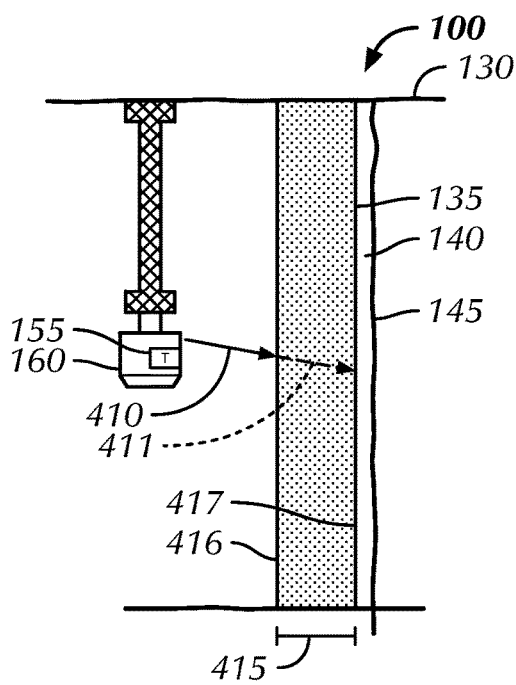
FIG. 4C illustrates a downhole tool including a scanning transducer disposed in a borehole having transmitted a signal that contacts the inner wall and back wall of the borehole casing according to the present disclosure.

FIG. 4C illustrates the downhole tool 100 of FIG. 4A and FIG. 4B including a scanning transducer 155 disposed in a borehole having transmitted a high frequency wave 410. The high frequency wave 410 contacts the inner wall 416 and penetrates the tubular casing 135 contacting the back wall 417 of the borehole tubular casing 135. In this embodiment, it is shown that the casing thickness 415 is represented by the distance between the inner wall 416 and the back wall 417 of the tubular casing 135.

As discussed in more detail below, by knowing the distance between the inner wall 416 and the back wall 417 of the tubular casing 135, using the time displacement of the inner wall echo 412 and the back wall echo 414, and the amount that the tubular casing 135 slows down the penetrating wave 411, the thickness of the tubular casing 135 can be calculated. Additionally, by using ratio of the first reflection amplitude (510) to the second reflection amplitude (530) (Echo Amplitude Ratio "EAR"), the impedance of the casing grout 140 may be determined.

Determining Cement Impedance Using Acoustic Echoes

To measure the impedance of the casing grout 140 (e.g., cement) we first normalize the amplitude of the second echo reflection (520) to the amplitude of the first echo reflection (500) (i.e., the Echo Amplitude Ratio discussed above). The EAR measurement can be performed by the downhole tool 100 using only the first echo reflection (500) and the second echo reflection (520), and may be used to remove any defects or corrosion that may be reflected in the first echo reflection (500) from propagating into the penetrating wave 411 thereby affecting the amplitude of the second echo reflection (520). For example, if there is a decrease in amplitude within the first echo reflection (500) due to corrosion within the inner wall 416 of the tubular casing 135, the decrease in amplitude will be reflected in the second echo reflection (520).

If the amplitude of the second echo reflection (520) is decreased as a result of defects within the inner wall 416 of the tubular casing 135, this could potentially cause the measurements to inaccurately reflect good bonding strength of the casing grout 140. As a result, the amplitudes are normalized so that the amplitude of the back echo reflection is accurately measured free of any induced effects of corrosion from the inner wall 416.

Figure 5A:
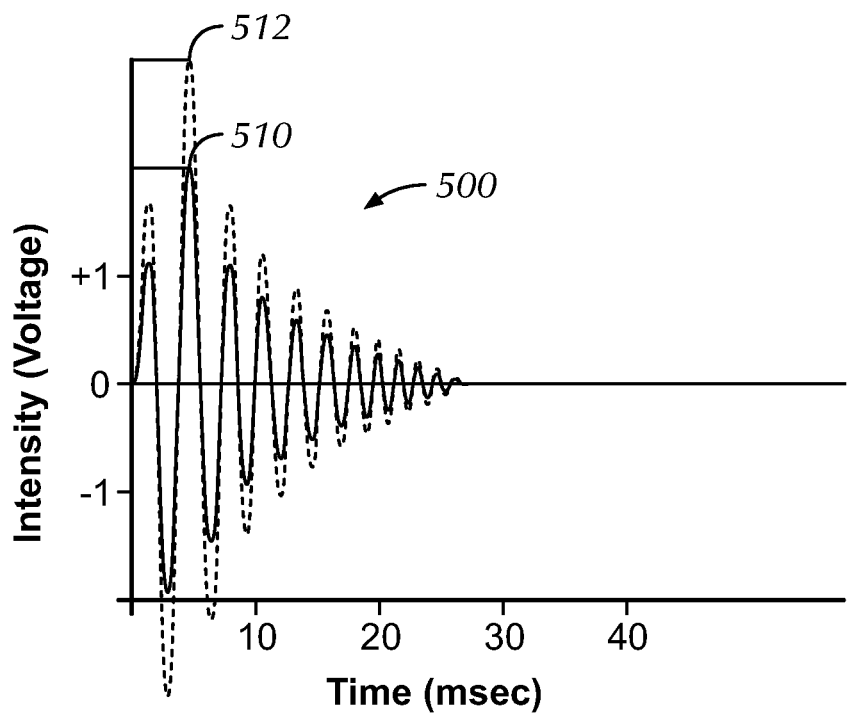
FIG. 5A illustrates acoustic waveform of an exemplary first echo reflection and a representative unaffected first echo reflection according to the present disclosure.

Normalization of the first and second echoes are better illustrated by referring to FIG. 5A. Here an exemplary first echo reflection 500 with its representative unaffected first echo reflection 500 is illustrated. As shown, the first continuous waveform represents a measured first echo reflection 500. The measured first echo reflection 500 has a first reflection amplitude (510) that has been affected by defects within the inner wall (416) of the tubular casing (135) (See FIG. 1). As a result, the first reflection amplitude 510 has been decreased, which is shown by comparing the measured first echo reflection 500 with the unaffected first echo reflection (512) (indicated by the dotted lines).

Comparing the two waveforms, we note that the measured first echo reflection 500 would have had an increased amplitude, equal to that of the unaffected first echo reflection 512, if there were not defects within the inner wall (416) of the tubular casing (135). As a result, the decrease in amplitude is calibrated out by normalizing the amplitude of the second echo reflection 520 to that of the first echo reflection 500.

Once the EAR has been determined, the impedance of the casing grout (140) can be determined according to the equation:

$$EAR = \left(\frac{4*Z1*Z0}{Z1^2 - Z0^2}\right) * \left(\frac{Z1-Z2}{Z1+Z2}\right)$$

Solving the equation for the impedance of the casing grout Z2 the equation becomes:

$$Z2 = Z1 * \left(\frac{K - EAR}{K + EAR}\right)$$

Where:

$$K = \left(\frac{4*Z1*Z0}{Z1^2 - Z0^2}\right)$$

Also, where the EAR (Echo Amplitude Ratio) in the above equation is measured by the downhole tool (100), Z1 represents the acoustic impedance of the tubular casing 135 (known constant), Z0 is the measured internal fluid impedance which is measured by the mud chamber in the tool, and where Z2 represents the impedance of the casing grout (140).

Therefore, as disclosed, the impedance to the casing grout (140) may be determined using only a first echo reflection 500 and a second echo reflection 520. However, the rate of decay of consecutive reflections of the back wall echo 414 may also be used by the above equation for determining the impedance of the casing grout (140). In this aspect, if the casing grout (140) has good compressive strength, the rate of the decay of the amplitudes of the back wall echoes (414) will be greater than if there is fluid behind the tubular casing (135). Thus, the EAR may likewise be determined by adding the amplitudes of the consecutive back wall echoes (414) and subsequently dividing by the amplitude of the first echo reflection 500.

Figure 5B:
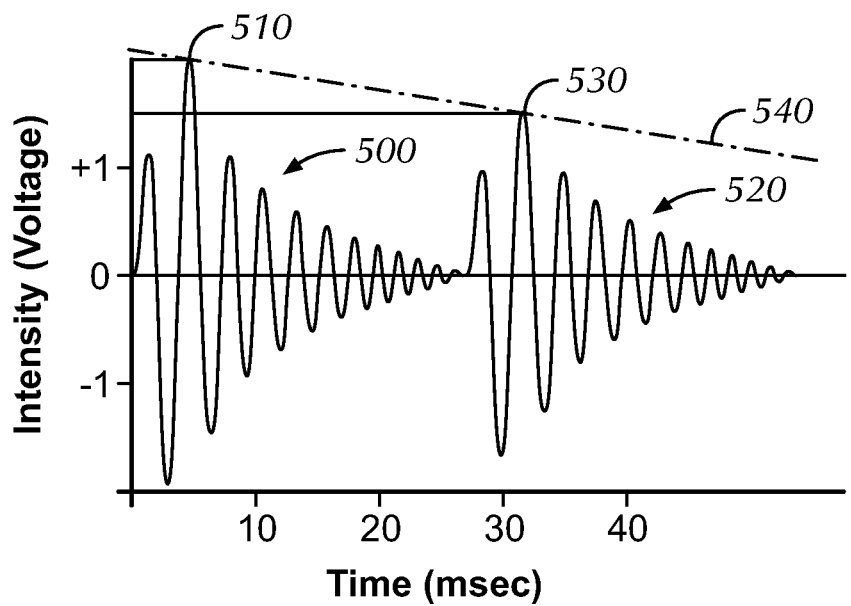
FIG. 5B illustrates exemplary acoustic waveform of first and second echo reflections according to the present disclosure.

Turning now to FIG. 5B, exemplary first and second echo reflections 500 and 520 are illustrated. As shown, the first echo reflection 500 is followed by a subsequent second echo reflection 520. Again, the first echo reflection 500 represents a first reflection of the high frequency wave (410) from the inner wall (416) of the tubular casing (135), while the second echo reflection 520 represents a second reflection of the high frequency wave (410) from the back wall (417) of the tubular casing (135). Also, as shown, the first reflection amplitude 510 has more intensity (i.e., a higher voltage) than the second reflection amplitude 530 of the second echo reflection. As described above, the amplitudes of these reflections are normalized and used in the above equation to solve for the impedance of the casing grout (140).

Determining Casing Thickness Using Acoustic Echoes

In another embodiment, the acoustic echoes from the inner wall 416 and the back wall 417 are used to determine the thickness of the tubular casing (135). As described above, this aspect of the disclosure is useful in measuring thick casings where inducing reverberations in the casing using a lower frequency is impractical.

For determining the thickness of the casing, the time difference between the scanning transducer (155) receiving the inner wall echo (412) and the back wall echo (414) is used. The larger the time difference between the echoes, the thicker the pipe. Also, because the sound slowness of the tubular casing (135) will affect or slow the penetrating wave (411) down before it is reflected and measured by the scanning transducer 155, the sound slowness of the casing is taken into consideration in determining the thickness of the pipe. The equation relating these quantities is given by:

$$\text{Thick} = \frac{\Delta Techo}{2 * Caslow}$$

Where Thick represents the thickness of the tubular casing 135 (i.e., casing thickness 415), ΔTecho is equal to the time difference of the received echoes, and where Caslow (known constant) represents the amount the tubular casing slows down the penetrating wave (411) before it is reflected off the back wall (417) and after it has been reflected as it travels through the casing back toward the scanning transducer (155).

Figure 6:
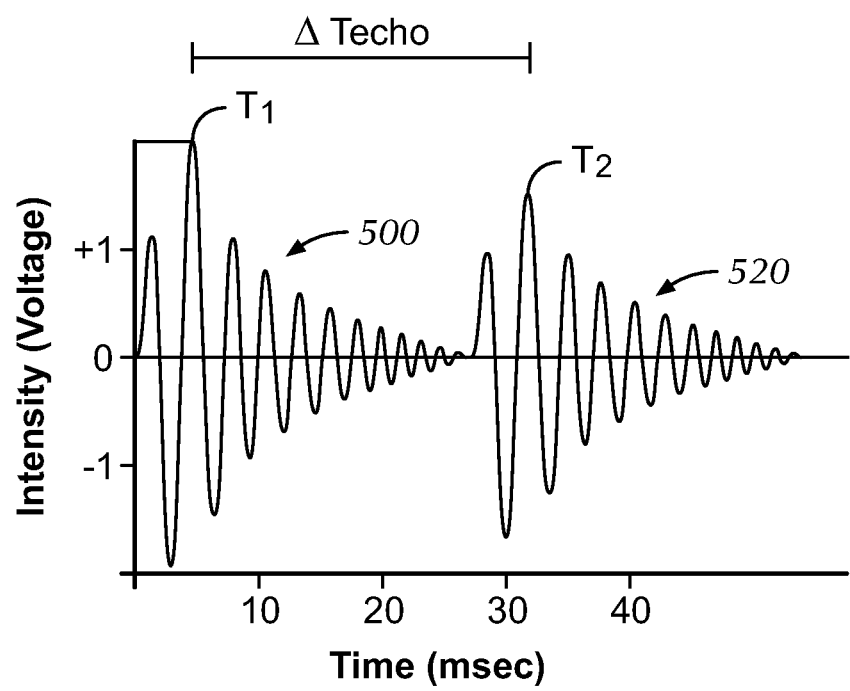
FIG. 6 illustrates the displacement in time of exemplary acoustic waveforms representing first and second echo reflections according to the present disclosure.

FIG. 6 further illustrates the displacement in time of exemplary first and second echo reflections 500 and 520. As shown, the first echo reflection 500 and second echo reflection 520 are separated in time by ΔTecho. ΔTecho is calculated by taking the time of the second echo reflection $t_2$ and subtracting the time of the first echo reflection $t_1$. In this illustration the discrete points of time associated with the amplitudes of the echo reflections may be used for measuring ΔTecho. Also, referring back to FIG. 4B, it is shown that the penetrating wave (411) of the high frequency wave (410) must travel through the tubular casing (135) twice (once upon entrance and once when reflected back to the scanning transducer (155). Thus, the sound slowness constant of the tubular casing (135) Caslow must be multiplied by two in order to compensate for the amount the high frequency wave (410) will be affected.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method using an acoustic logging system in a borehole having a borehole casing filled with fluid, the borehole casing being surrounded by casing grout, having an inner wall, having a back wall, and being excitable at a resonant frequency that induces reverberation, the borehole casing having a first impedance, the method comprising:

using a transducer of the acoustic logging system to transmit a signal in the direction of the borehole casing, the signal providing a frequency different from the resonant frequency of the borehole casing that induces reverberation, the signal producing acoustic echoes;

9 receiving a first of the acoustic echoes with the transducer from the inner wall of the borehole casing;

receiving a second of the acoustic echoes with the transducer from the back wall of the borehole casing, and determining a naught impedance of the fluid in the borehole casing with the acoustic logging system;

determining, with at least one processor of the acoustic logging system, at least one borehole parameter based on at least one of the first and second acoustic echoes comprising determining a second impedance (Z2) of the casing grout based at least in part on the naught impedance (Z0) of the fluid, the first impedance (Z1) of the borehole casing, and a ratio of amplitudes of the first and second acoustic echoes.

2. The method of claim 1, wherein using the transducer to transmit the signal in the direction of the borehole casing comprises transmitting the signal to provide the frequency of at least 3 to 5 times the resonant frequency of the borehole casing.

3. The method of claim 1, wherein using the transducer to transmit the signal in the direction of the borehole casing includes transmitting the signal perpendicular to the major axis of the borehole casing.

4. The method of claim 1, wherein determining the second impedance of the casing grout is determined according to the equation:

$$Z2 = Z1 * \left(\frac{K - EAR}{K + EAR}\right)$$

where:

$$K = \left(\frac{4 * Z1 * Z0}{Z1^2 - Z0^2}\right)$$

EAR is an Echo Amplitude Ratio related to the ratio of the amplitudes measured by the acoustic logging system, Z1 is the first, acoustic impedance of the borehole casing which is a known constant, Z0 is the naught, internal fluid impedance of the fluid measured by a mud chamber in the acoustic logging system, and Z2 is the second impedance of the casing grout.

5. The method of claim 4, wherein the Echo Amplitude Ratio comprises the ratio of the amplitude of the second acoustic echo to the amplitude of the first acoustic echo.

6. The method of claim 5, wherein the Echo Amplitude Ratio is determined by adding the amplitudes of more than one of the second acoustic echoes from the back wall of the borehole casing and dividing the sum by the amplitude of the first acoustic echo.

7. The method of claim 1, wherein determining the at least one borehole parameter further includes determining a thickness of the borehole casing.

8. The method of claim 7, wherein determining the thickness of the borehole casing is determined according to the equation:

$$\text{Thick} = \frac{\Delta Techo}{2 * Caslow}$$

where,

Thick is the thickness of the borehole casing,

ΔTecho is a time difference between receiving the first acoustic echo and receiving the second acoustic echo, and where

10

Caslow is an amount the borehole casing slows down a penetrating wave which is a known constant.

9. A downhole tool used in a borehole having a borehole casing filled with fluid, the borehole casing surrounded by casing grout, having an inner wall, having a back wall, and being excitable at a resonant frequency that induces reverberation, the borehole casing having a first impedance, the tool comprising:

an acoustic transducer configured to measure acoustic echoes in the borehole, the acoustic transducer configured to:

transmit a signal in the direction of the borehole casing, the signal providing a frequency different from the resonant frequency of the borehole casing that induces reverberation, the signal producing acoustic echoes;

receive a first of the acoustic echoes with the transducer from the inner wall of the borehole casing;

receive a second of the acoustic echoes with the transducer from the back wall of the borehole casing, and a processor communicatively coupled to the acoustic transducer and having one or more instructions that when executed cause the processor to:

determine a naught impedance of the fluid in the borehole casing with the downhole tool; and determine at least one borehole parameter based on at least one of the first and second acoustic echoes, comprising determining a second impedance (Z2) of the casing grout based at least in part on the naught impedance (Z0) of the fluid, the first impedance (Z1) of the borehole casing, and a ratio of amplitudes of the first and second acoustic echoes.

10. The downhole tool of claim 9, wherein the acoustic transducer is configured to transmit the signal in the direction of the borehole casing to provide the frequency of at least 3 to 5 times the resonant frequency of the borehole casing.

11. The downhole tool claim 9, wherein the acoustic transducer is configured to transmit the signal perpendicular to the major axis of the borehole casing.

12. The downhole tool of claim 9, wherein the second impedance of the casing grout is determined according to the equation:

$$Z2 = Z1 * \left(\frac{K - EAR}{K + EAR}\right)$$

where:

$$K = \left(\frac{4 * Z1 * Z0}{Z1^2 - Z0^2}\right)$$

EAR is an Echo Amplitude Ratio related to the ratio of the amplitudes measured by the downhole tool, Z1 is the first, acoustic impedance of the borehole casing which is a known constant, Z0 is the naught, internal fluid impedance measured by a mud chamber in the downhole tool, and Z2 is the second impedance of the casing grout.

13. The downhole tool of claim 12, wherein the Echo Amplitude Ratio comprises the ratio of the amplitude of the second acoustic echo to the amplitude of the first acoustic echo.

14. The downhole tool of claim 12, wherein the Echo Amplitude Ratio is determined by adding the amplitudes of more than one of the second acoustic echoes from the back wall of the borehole casing and dividing the sum by the amplitude of the first acoustic echo.

15. The downhole tool of claim 9, wherein to determine the at least one borehole parameter, the one or more instructions further cause the processor to determine a thickness of the borehole casing.

16. The downhole tool of claim 15, wherein the thickness of the borehole casing is determined according to the equation:

$$\text{Thick} = \frac{\Delta Techo}{2 * Caslow}$$

where,

Thick is the thickness of the borehole casing, $\Delta Techo$ is a time difference between receiving the first acoustic echo and receiving the second acoustic echo, and where Caslow is an amount the borehole casing slows down a penetrating wave which is a known constant.

17. A downhole tool used in a borehole having a borehole casing filled with fluid, the borehole casing surrounded by casing grout, having an inner wall, having a back wall, and being excitable at a resonant frequency that induces reverberation, the borehole casing having a first impedance, the tool comprising:
 a means for transmitting a signal in the direction of the borehole casing to provide a frequency different from the resonant frequency of the borehole casing that induces reverberation, the signal producing acoustic echoes;
 a means for receiving a first of the acoustic echoes from the inner wall of the borehole casing;
 a means for receiving a second of the acoustic echoes from the back wall of the borehole casing;
 a means for determining a naught impedance of the fluid in the borehole casing with the tool; and
 a means for determining at least one borehole parameter based on at least one of the first and second acoustic echoes comprising means for determining a second impedance (Z2) of the casing grout based at least in part on the naught impedance (Z0) of the fluid, the first impedance (Z1) of the borehole casing, and a ratio of amplitudes of the first and second acoustic echoes.

18. The downhole tool of claim 17, wherein the means for transmitting the signal comprises means for transmitting the signal in the direction of the borehole casing to provide the frequency of at least 3 to 5 times the resonant frequency of the borehole casing.

19. The downhole tool of claim 17, wherein the second impedance of the casing grout is determined according to the equation:

$$Z2 = Z1 * \left(\frac{K - EAR}{K + EAR}\right)$$

where:

$$K = \left(\frac{4 * Z1 * Z0}{Z1^2 - Z0^2}\right)$$

EAR is an Echo Amplitude Ratio related to the ratio of the amplitudes measured by the downhole tool, Z1 is the first, acoustic impedance of the borehole casing which is a known constant, Z0 is the naught, internal fluid impedance measured by a mud chamber in the downhole tool, and Z2 is the second impedance of the casing grout.

20. The downhole tool of claim 19, wherein the Echo Amplitude Ratio comprises the ratio of the amplitude of the second acoustic echo to the amplitude of the first acoustic echo.

21. The downhole tool of claim 19, wherein the Echo Amplitude Ratio is determined by adding the amplitudes of more than one of the second acoustic echoes from the back wall of the borehole casing and dividing the sum by the amplitude of the first acoustic echo.

22. The downhole tool of claim 17, wherein the means for determining the at least one borehole parameter further comprises means for determining a thickness of the borehole casing.

23. The downhole tool of claim 22, wherein the thickness of the borehole casing is determined according to the equation:

$$\text{Thick} = \frac{\Delta Techo}{2 * Caslow}$$

where,

Thick is the thickness of the borehole casing, $\Delta Techo$ is a time difference between receiving the first acoustic echo and receiving the second acoustic echo, and Caslow is an amount the borehole casing slows down a penetrating wave which is a known constant.

* * * * *